United States Patent [19]

Rice et al.

[11] Patent Number: 5,279,259

[45] Date of Patent: Jan. 18, 1994

[54] ANIMAL LITTER COMPOSITIONS

[75] Inventors: David W. Rice, Tallahassee; Walter E. Howell, Quincy; Eric K. Yildirim, Tallahassee, all of Fla.

[73] Assignee: Floridin Company, Tallahassee, Fla.

[21] Appl. No.: 741,847

[22] Filed: Aug. 7, 1991

[51] Int. Cl.[5] ............................................. A01K 1/015
[52] U.S. Cl. .................................... 119/173; 119/171
[58] Field of Search .......................... 119/171, 172, 173

[56] References Cited

U.S. PATENT DOCUMENTS

| | | | |
|---|---|---|---|
| 4,458,629 | 7/1984 | Gerber | 119/172 |
| 4,671,208 | 6/1987 | Smith | 119/173 |
| 4,881,490 | 11/1989 | Ducharme et al. | 119/173 |
| 5,062,383 | 11/1991 | Nelson | 119/173 |
| 5,101,771 | 4/1992 | Goss | 119/173 |

FOREIGN PATENT DOCUMENTS

| | | | |
|---|---|---|---|
| 0087001 | 8/1983 | European Pat. Off. | 119/173 |
| 378421 | 7/1990 | European Pat. Off. | 119/173 |
| 0185323 | 7/1988 | Japan | 119/173 |

*Primary Examiner*—John G. Weiss
*Attorney, Agent, or Firm*—James R. Thornton

[57] ABSTRACT

Clumping animal litter compositions comprising particulate attapulgite clay having a moisture content in the range of from about 10 to 23 percent free moisture and a particle size distribution of from about 8 to about 40 mesh, preferably about 10 to 30 mesh. Method of production includes selection of an attapulgite clay having an API yield value of at least 80 barrels per ton and, preferably, kneading and extruding the clay, milling and heating the clay to a temperature not exceeding about 250° F. to reduce the moisture content to about 10 to 23 percent, and screening the product to a mesh size of about 8 to 40 mesh.

21 Claims, No Drawings

ANIMAL LITTER COMPOSITIONS

This invention relates to animal litter compositions and more particularly, to an improved animal litter composition which is capable of clumping on contact with liquid animal wastes.

BACKGROUND OF THE INVENTION

As a result of an increasingly greater proportion of the population residing in cities with smaller homes and apartments, the housing of small pets presents additional problems. This is especially true of domestic cats which are confined indoors most of the time. As a result, the pet owner must provide for the animal waste materials, such as feces and urine. Most house-broken cats have learned to use a litter box which is generally a pan filled with an absorbent material, such as clay, wood chips, wood shavings, sawdust, porous polymeric materials, shredded paper, sand, etc.

A desirable absorbent for pet litter compositions possesses not only high moisture absorptivity, but also has a high absorptivity for odors, a low degree of dusting, adequate crush strength and a lack of toxicity to the pet. Granular clay pet litters have been available for approximately forty years and are typically 6/30 mesh size clays. These clays may be bentonite-type clays or attapulgite and typically, have been dried to a free moisture content of less than about 8 percent An unpleasant chore faced by many pet owners is keeping the litter box clean so as to avoid unpleasant odors, spread of disease, etc. Generally, the feces can be merely separated from the absorbent material by use of a scoop or slotted spoon, but the liquid urine can spread throughout the absorbent material in the litter box and create a problem of odors and be a source of disease. As a result, the pet owner must discard the entire contents of the box after a relatively short period of use.

Recently, several products have been introduced that provide a clumping or agglomeration of the absorbent so as to form a clump of sufficient strength and integrity to be removed from the litter box and leave the unused absorbent material for further use. These products generally include an additive, such as a water absorbent polymer which clumps when contacted with the animal urine; see, for example, U.S. Pat. No. 4,685,420. See also U.S. Pat. No. 5,000,115 which proposes the use of a water-swellable bentonite clay which agglomerates and forms a stable mass upon contact with animal urine. The water swellable bentonite clays are described as being any member of the dioctahedral or trioctahedral smectite group, with montmorillonite being the most commonly known example. Although, attapulgite and sepiolite are also mentioned as examples of bentonite clay, these materials are not classified as bentonite clays by those skilled in clay technology.

The clumping litter materials which have been introduced over the past 5 years, are generally a finer absorbent material, typically being about 30/60 mesh. However, this presents disadvantages, since pets can track the 30/60 mesh more readily than the previously used granular 6/30 mesh products. Also, the clump's strength is often insufficient, and the clumps break up when the pets walk on them, or attempts are made to scoop the clumps up for removal from the litter. Further, those clumps that have high clump strength do not readily disintegrate in water and thus cannot be flushed in the toilet, and the chemical polymer additives which are sometimes used to improve clump strength, may impose an environmental hazard.

Other patents of interest, disclosing various clay-based animal litter compositions are U.S. Pat. Nos. 2,895,873, 3,029,783, 4,591,581 and 4,657,881. Several patents also describe use of various additives in animal litter compositions, primarily for controlling odor. See U.S. Pat. Nos. 3,352,792, 4,437,429, 4,407,231, 4,844,010, 4,949,672, 5,005,520 and 5,018,482.

DESCRIPTION OF THE INVENTION

According to the present invention, there is provided an improved clumping pet litter composition which overcomes many of the disadvantages of the prior compositions. There is also provided a method for producing an improved clumping pet litter composition from readily available natural materials which do not pose an environmental hazard and do not require any additives.

The improved animal litter compositions of this invention comprise a particulate attapulgite clay having a moisture content in the range of from about 10 to about 23 percent free moisture, and a particle size distribution of from about 8 to 40 mesh. Preferably, the particle size range is from about 10 mesh to about 30 or 40 mesh.

The pet litter composition agglomerates and forms a clump upon contact with the animal urine and the clump has sufficient strength and integrety for easy separation from the remaining unwetted litter. An added advantage is that the clumps may be readily disposed of in a domestic toilet since they will rapidly disintegrate and disperse in water. Further, the high absorbency of the clay results in less clay being used.

The improved litter compositions of this invention are produced from a specific type of attapulgite clay having a particular moisture content and essential yield viscosity range. The clay is attapulgite, preferably having a minimum amount of impurities such as bentonite. Such impurities can give the litter composition inferior clumping properties and/or result in weak clumps.

According to the method of this invention, the process for obtaining the improved litter composition comprises the steps:

(a) Selecting a gelling quality attapulgite clay having a viscosity measured as an API yield of at least about 80 bbls per ton;

(b) milling and heating the clay to a temperature not in excess of about 250° F. to obtain a granular clay product having about 10 to 23 percent free moisture; and (c) screening the resultant granular clay to a mesh size of about 8 to 40 mesh in which at least about 90 percent of the particles are between 8 and 40 mesh and not more than 5 percent of the particles are larger than 8 mesh or smaller than 40 mesh.

The specific steps of the method of this invention are required to assure the production of an animal litter composition having superior clumping properties. These start with selection of the crude clay which must be an attapulgite clay, and preferably is what is known to the art as gelling-grade clay. The presence of impurities, such as montmorillonite, adversely affects the gelling properties of the clay and will adversely affect the clump strength of the animal litter composition. A measure of gelling capability is the viscosity, determined as the API yield value according to the procedure of the American Petroleum Institute, RP13B—Standard Procedure for Testing Drilling Fluids. The yield point is determined by use of a direct-indicating viscometer such as supplied by Fann Instruments of Houston, Tex. and the reading at 600 rpm. is converted to barrels per ton according to conversion factors supplied by the instrument manufacturer.

In order to obtain the superior litter compositions of this invention, the crude attapulgite clay must have an API yield value of at least 80 and preferably 100 or above.

The free moisture content of the crude clay is generally in the range of about 45 to 55 percent. The crude clay is crushed in a primary crusher to a manageable size of less than about 3 inches and preferably sent to a mixer-extruder apparatus in which the clay is mixed and kneaded while still plastic, and then extruded through cylindrical extruders to give cylindrical pellets. A small amount (about 5 percent) of additional water may be added during mixing to facilitate processing. The extrudate, having about 45 to 55 percent free moisture, is then milled and dried, such as in a hammer mill or roller mill, well known to the clay processing art. The drying is accelerated by a flow of heated air to the mill. It is critical however, that the temperature of the clay not exceed about 250° F., and that the free moisture be reduced to a range of from about 10 to about 23 percent, preferably about 13 to 18 percent.

The dried clay is then subjected to a screening procedure to separate the desired clay product having the required particle size distribution essential for obtaining the superior clumping properties of the animal litter. It has been found that a particle size distribution of from about 8 to 40 mesh (about 420 to 2380 microns in diameter) is required for obtaining the superior clumping properties of this invention. Preferably, at least about 90 percent of said particles are between 10 mesh and 40 mesh and not more than 5 percent of the particles are larger than 8 mesh or smaller than 40 mesh. Although it has been found that the coarser particle size product with a narrow particle size distribution, such as 8/16 mesh, gives a stronger clump or agglomerate and is less likely to be tracked by the pet, this coarser size material has the disadvantage of not absorbing as much liquid waste as a finer mesh, thus requiring a greater amount of litter composition. On balance, from the standpoint of desirable properties and economics, the preferred particle size distribution is in the range of from about 10 to about 30 mesh.

As pointed out above, although it is preferred to knead and extrude the moist crude clay prior to the milling operation, it is not required. If the kneading/extrusion step is included, conventional additives for attapulgite clay, such as a small amount (about 1 percent) of magnesium oxide, may be included in the feed mix, but such additives are not required to achieve the beneficial clumping properties of the improved pet litter compositions of this invention. Other beneficial additives for animal litter compositions may also be included, such as odor inhibitors, disinfectants, coloring agents, perfumes, antimicrobial agents, etc.

EXAMPLES

The following examples illustrate the litter compositions of this invention and the methods for preparation thereof.

EXAMPLES 1-8

Attapulgite clay having an API yield strength of 143 was crushed in a primary crusher to less than 3 inches. The crushed product, having a free moisture content of about 45 percent, was blended with 1 percent MgO and fed to a screw mixer/extruder and kneaded for about 5 to 10 minutes, and then extruded to give an extrudate having 47 percent free moisture. About 5 percent additional water was fed to the mixer during the mixing step. The extrudate was milled in a Williams swing hammer mill with an internal air classifier. Drying air heated to about 900° F. was fed to the mill, to give a dried product having about 17.4 percent free moisture. The clay particles did not reach a temperature exceeding about 200° F. during the drying. The product was screened and the 10/40 mesh product collected. The product was evaluated as a pet litter as follows:

To determine the clumping properties and clump strength, a sample of the clay was placed in a shallow pan and 10 ml. of water poured on the surface of the clay at a steady rate over a period of about 4-5 seconds. The water penetrated into the clay sample and formed a cone-shaped cake. After about fifteen minutes, the cake was removed from the container and placed in a "U" shaped support on an electronic scale. Force was applied to the center of the cake by pushing a bar between the arms of the support unit, and the magnitude of the force read from the scale as the clump breaks. The procedure was repeated 5 times and the average determined as the clump strength. The clump was weighed to determine the amount of clay to absorb 10 grams of water and recorded as the clay weight (in grams).

Similar tests were run using different crude clay samples having a variety of API yield viscosity values. In some tests, the hammer mill was substituted by a roller mill and/or extrusion was omitted. The results are summarized in Table I.

TABLE I

| Exam. | Clay API No. | Extrusion | Mill | Free Moisture % | Clump Strength | Clay** Weight |
| --- | --- | --- | --- | --- | --- | --- |
| 1 | 143 | Yes | Hammer | 17.4 | 173 | 7.52 |
| 2 | 137 | No | Roller | 15.9 | 161 | 8.89 |
| 3 | 142 | Yes | Roller | 20.3 | 173 | 8.85 |
| 4 | 127 | No | Hammer | 13.4 | 133 | 10.13 |
| *5 | 99 | Yes | Hammer | 17.6 | 160 | 7.25 |
| *6 | 102 | No | Roller | 15.5 | 139 | 8.62 |
| *7 | 130 | Yes | Roller | 16.0 | 192 | 7.48 |
| *8 | 120 | No | Hammer | 15.8 | 191 | 8.84 |

*MgO addition was omitted.
**Clump weight minus 10 gms of water

EXAMPLE 9

The procedure described above was repeated using an attapulgite clay with an API yield strength of 143 and moisture content of about 45%. The process included kneading/extrusion with addition of 1% magnesium oxide. The extrudate was milled in a hammer mill. The particulate product was screened to give various fractions with different mesh size ranges. The clumping properties and clump strength of each fraction was determined as described above and reported as set forth in Table II.

TABLE II

| Mesh Size | Clump Strength | Clay Weight |
| --- | --- | --- |
| 8 × 16 | 258 | 15.1 |
| 10 × 30 | 187 | 11.2 |
| 16 × 30 | 157 | 9.6 |
| 10 × 40 | 137 | 8.9 |
| 16 × 60 | 73 | 6.2 |
| 20 × 60 | 44 | 5.8 |

TABLE II-continued

| Mesh Size | Clump Strength | Clay Weight |
|---|---|---|
| 30 × 60 | 56 | 5.5 |
| 20 × 40 | 107 | 7.6 |
| 6 × 8 | 0 | — |

The strength of the clump is a function of the thickness and shape of the cake formed and the adhesion between the particles when they come in contact with moisture. Adhesion is primarily influenced by the clay yield (type of clay) and the method of milling and drying. The thickness and shape of the clump is affected by the particle size distribution. As the particle size distribution become broader and finer (16/60), the clay particles pack more closely and the liquid spreads out rather than penetrating. This results in a thin weak cake. Water penetrates a narrow, coarse distribution (8/16) better, resulting in a cone-shaped, stronger clump. However, the coarser material requires a greater amount of litter to absorb the liquid. The optimum distribution based on maximum absorption and economic consideration is 95 percent of the particles no larger than 8 or 10 mesh and 95 percent of the particles no smaller than 30 to 40 mesh.

Various modifications and changes to the invention can be made and, to the extent that such variations incorporate the spirit of this invention, they are intended to be included within the scope of the appended claims.

We claim:

1. An animal litter composition capable of clumping when contacted with liquid animal waste, comprising particulate attapulgite clay having a moisture content in the range of from about 10 to 23 percent free moisture and a particle size distribution of from about 8 to 40 mesh, whereby said clumps have sufficient strength for separation from unwetted litter and readily disintegrate and disperse in water.

2. A litter composition in accordance with claim 1 in which said moisture content is about 13 to 18 percent free moisture.

3. A litter composition in accordance with claim 1 in which said particle size distribution is from about 10 to about 30 mesh.

4. A litter composition in accordance with claim 1 in which said particle size distribution is from about 16 to about 30 mesh.

5. A litter composition in accordance with claim 1 in which said particle size distribution is from about 10 to about 40 mesh.

6. A litter composition in accordance with claim 1 in which said particle size distribution is from about 8 to about 30 mesh.

7. An animal litter box comprising a water-impermeable container having distributed therein a litter composition in accordance with claim 1.

8. The method for producing an animal litter composition which forms strong readily separable clumps upon contact with liquid animal waste which comprises the steps: a) selecting a gelling quality attapulgite clay having an API yield of at least 80 bbls. per ton, b) milling and heating said clay to a temperature not in excess of about 250° F. to obtain a particulate clay product having about 10 to 23 percent free moisture, and c) screening said resultant particulate clay product to a mesh size of about 8 to 40 mesh in which at least about 90 percent of the particles are between 8 to 40 mesh and not more than 5 percent of the particles are larger than 8 mesh or smaller than 40 mesh.

9. The method in accordance with claim 8 in which at least about 90 percent of said particles are between 10 mesh and 30 mesh.

10. The method in accordance with claim 8 in which said gelling quality clay is kneaded and extruded prior to said milling and heating step.

11. The method in accordance with claim 10 in which about 1 percent magnesium oxide is added to said clay prior to kneading and extrusion.

12. The method in accordance with claim 8 in which said API yield is at least 100 bbls. per ton.

13. The method in accordance with claim 8 in which said granular clay product has about 13 to 18 percent free moisture.

14. The method in accordance with claim 8 in which said clay is milled in a roller or hammer mill.

15. The method in accordance with claim 8 in which at least 90 percent of said particles are between 10 and 40 mesh.

16. The method in accordance with claim 8 in which at least 90 percent of said particles are between 8 and 30 mesh.

17. The method in accordance with claim 8 in which at least 90 percent of said particles are between 8 to 16 mesh.

18. The method in accordance with claim 8 in which at least 90 percent of said particles are between 16 and 30 mesh.

19. An animal litter composition produced by the method of claim 8.

20. An animal litter composition produced by the method of claim 10.

21. An animal litter composition produced by the method of claim 12.

* * * * *